United States Patent [19]
Blake

[11] 3,892,433
[45] July 1, 1975

[54] DIRECT SOLAR HYDRO-ELECTRIC INTEGRATED SYSTEM AND CONCENTRATING HELIOSTAT FOR SAME

[75] Inventor: Floyd A. Blake, Littleton, Colo.

[73] Assignee: Martin Marietta Corporation, New York, N.Y.

[22] Filed: Sept. 21, 1973

[21] Appl. No.: 399,669

[52] U.S. Cl. .................. 290/52; 290/2; 126/270
[51] Int. Cl. ......................................... G02b 5/10
[58] Field of Search ............ 290/1, 2, 4, 52; 60/26; 307/43, 64, 65, 84, 85; 126/270, 271

[56] References Cited
UNITED STATES PATENTS

| | | | |
|---|---|---|---|
| 2,987,961 | 6/1961 | Cotton et al. | 126/270 X |
| 3,070,703 | 12/1962 | Podolny | 290/2 |
| 3,124,699 | 3/1964 | Kirchmayer | 290/4 X |
| 3,152,260 | 10/1964 | Cummings | 290/52 |
| 3,466,119 | 9/1969 | Francia | 126/270 X |
| 3,546,475 | 12/1970 | Kubo et al. | 307/85 |
| R25,242 | 9/1962 | Toulmin, Jr. | 290/52 |

*Primary Examiner*—Robert K. Schaefer
*Assistant Examiner*—W. E. Duncanson, Jr.
*Attorney, Agent, or Firm*—Sughrue, Rothwell, Mion, Zinn & Macpeak

[57] ABSTRACT

A fan shaped array of spherical, concave mirrors are mounted for individual rotation about right angle axes and track the sun to concentrate reflected solar rays into the aperture of a tubular boiler/superheater with the superheated steam driving a turbine generator unit. Preferably, the solar powered turbine generator is sized to match generating capacity of an existing hydro-electric system, thus permitting the existing hydro-electric system to operate on a day-to-day basis at higher capacity during any day of clear weather where the solar power plant carries the complete electrical load during those hours when hydro-electric generation ceases.

11 Claims, 4 Drawing Figures

HELIOSTAT MIRROR 101 FLUX PATTERN

DIRECT SOLAR HYDRO-ELECTRIC INTEGRATED SYSTEM AND CONCENTRATING HELIOSTAT FOR SAME

BACKGROUND OF THE INVENTION

1. Field of the Invention

This invention relates to solar power plants, and more particularly, to a solar augmented hydro-electric power system and a concentrating heliostat for improved radiant energy conversion.

2. Description of the Prior Art

The electrical power from typical existing hydro-electric power systems is limited by the water supply and demand from water users downstream. Where irrigation is of no consequence, the limitation of the power plant resides in the generating capacity, the transmission line capacity and the amount of the water supply. Generally, the amount of water discharged from the dam upstream of the hydro-electric power system is determined on a yearly average. In contrast, where the dams are primarily to control the flow of water to water users downstream such as irrigation projects, the volume of the water released from the dam is based on the demand from the water users. In either case, most systems operate at low load factors, referenced to either their generating capacity or their transmission line capacity. In an attempt to meet existing generating capacity but in those hydro-electric power systems wherein the demand from the water users would ordinarily limit the volume of water passing through the turbine, existing hydro-electric installations have augmented the power delivered in peak operation, by turbine generator units, which may act either as a turbine generator or a motor driven pump, depending upon whether water released from the dam upstream drives the unit, and electrical power is delivered to the transmission system, or whether the motor acts as a generator and drives the turbine as a hydraulic pump, and wherein water is literally pumped back from a downstream reservoir to the upstream dam. In such cases, of necessity a downstream dam or reservoir is required to both meter the flow of water to the water users downstream, determined by their demand, and to act as a collection or sump to permit the auxiliary hydro-electric turbine generator to pump the water back to the upstream dam.

With the addition of the secondary hydro-electric turbine, the increased water use during peak operation would normally prematurely drain the upstream dam and water must be "pumped back" during off peak hours of the system using power from the steam plants tied into the electrical network. In such pump back augmentation systems, while the secondary hydro-electric turbine generator raises the capacity of the power system to meet peak operational loads, it has certain disadvantages. It provides purely a peak period performance scheme since at other times it must pump back the amount of water passing through the turbine, and secondly, there is the requirement that a second storage dam be provided downstream of the secondary pump back turbine generator. Further, for each two kilowatt hours generated by the secondary turbine generator, three kilowatt hours of energy are required to pump back the water from the downstream storage dam to the upstream dam.

In existing solar thermal power plants where large energy conversion has been attempted, solar rays have been reflected onto a large area paraboloidal mirror from a great number of fixed planar mirrors with the parabolodial concentrating mirror built into the side of a multi-story building to effect concentration of the thermal energy collected from the multiple mirrors. The cost of the large area paraboloidal mirror, particularly of such size, makes practical employment of large size classical heliostats impractical to thermal powered generator systems which neither require the maximum concentration of the rays nor the temperature resulting therefrom.

To reduce costs, attempts have been made to produce a solar thermal power system employing a semi-heliostat in which a field or array of dynamic mirrors tracks to a common focus. With the semi-heliostat, the size of the heat receiver must correspond to the size of the individual mirrors which results in a poor thermal energy retention.

Further attempts have been made to employ paraboloidal mirrors for reflecting the thermal energy directly onto the heat receiver. However, the cost is prohibitive, since the manufacture of mirrors in plane configuration is vastly cheaper than manufacture of precision parabolic mirrors. The employment of parabolic cylinders, while reducing the cost of the reflecting mirrors, has the built-in limitation that temperatures on the order of 500° F. are the maximum reachable, and further requires that the concentration of the thermal energy be applied to a line extending the length of the parabolic cylinder in contrast to the point of concentration of a paraboloidal mirror.

SUMMARY OF THE INVENTION

The present invention is directed to an improved solar thermal power plant which employs a concentrating heliostat involving a plurality of spherical concave mirrors mounted for rotation about their centers in both azimuth and elevation to track the sun as it crosses the sky and permits concentration of the rays from each mirror into a narrow elliptical pattern at the focal plane which coincides with the aperture of the heat receiver.

The concentrating heliostat for the solar thermal power plant may take the form of a plurality of rows of spherical concave mirrors in fan shaped configuration, the mirror rows being positioned at a slope angle from 20° to 35° relative to the horizontal at increasing height in the direction away from the heat receiver. The mirror rows to each side of the north-south axis of the heat receiver provide a maximum approach angle of 45° relative to the heat receiver aperture to insure concentration of the reflected solar rays to the aperture of the receiver. Each of the concentrating heliostat reflecting mirrors is spherical and concave and has a radius of curvature dependent upon its position relative to the heat receiver aperture for focusing thereon, and while the tips of the mirrors result in distortion concentration of the energy by focusing the reflected solar rays onto the heater aperture, these permit greater than 100 to 1 ray concentration. In a dual heat receiver, a second fan-shaped heliostat array of spherical concave mirrors is positioned on the north-south axis of the heat receiver to the side opposite that of the horizontally inclined array with all of the mirror rows, at the same elevation. The individual mirrors of each of the fan shaped arrays are mounted for pivoting orthogonally about their centers to permit elevational and azimuth tracking of the sun while maintaining concentrated reflected ray impingement at the he receiver aperture. Conventional sensor-servo mechanisms track the bisector of the angle between the sun-mirror vector and the heat receiver-mirror vector, to insure such ray impingement by driving the mirrors orthogonally about their centers.

The solar thermal power plant involving the concentrating heliostat of the present invention is preferably employed as an augmentation to an existing hydroelectric power system, with the total power generation increased by controlling the generation such that the solar power system maintains full generating capacity during the period of time permitted by the sunlight impingement on the heliostat, on those days on which the augmenting solar system receives sunlight. This permits the existing hydro-electric generator to operate at increased power levels during the non-sunlight period, due to the increased water supply from the water saved during periods of solar plant operation.

The augmenting solar thermal power plant may operate further in conjunction with an auxiliary pump back hydro-electric turbine generator, wherein the power difference between the capacity of the solar thermal power plant and the electrical load on the electrical network system may be employed in electrically powering the pump back turbine generator to return water to the upstream dam, maximizing generator capacity during solar radiation of the solar thermal power plant, while permitting the pump back feature to increase the overall capacity of the combined solar thermal and hydro-electric power plant.

DESCRIPTION OF THE PREFERRED EMBODIMENT

Figure 1:
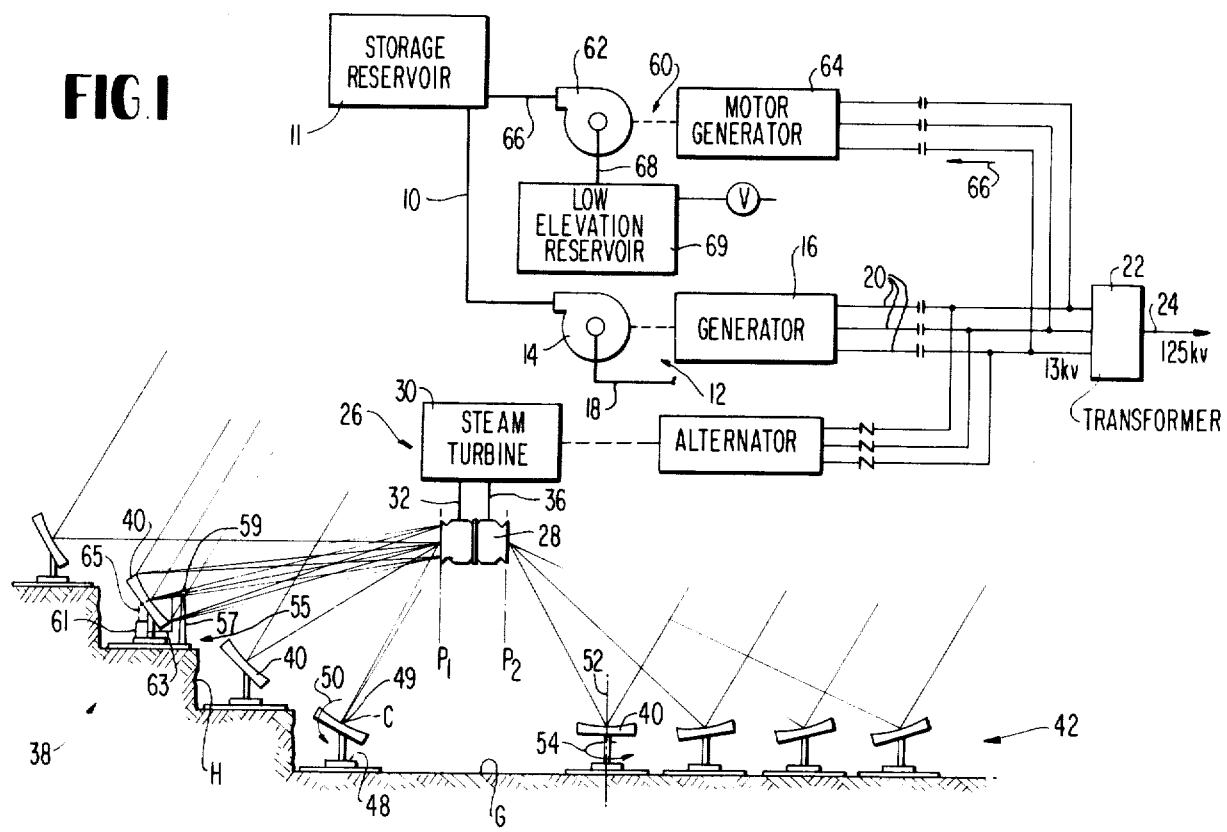
FIG. 1 is a schematic representation of a solar thermal power plant augmented hydro-electric power system forming one embodiment of the present invention.

Reference to FIG. 1 illustrates schematically a solar augmented hydro-electric power system of the present invention, particularly employing a concentrating heliostat which facilitates by concentration of reflected solar energy, the highly efficient production of superheated steam within a heat receiver solar energy receiving cavity or chamber at the focal plane of the heliostat which generates steam to drive a steam turbine generator unit. The illustrated example of FIG. 1 is based on the capacity of the Horse Mesa Dam of the Salt River Project in Arizona. In that respect, the existing dam permits discharge of water through suitable conduit 10 from the upstream dam 11 to hydro-electric turbine generator unit or units indicated generally at 12 and constituting the hydro-turbine 14 and the electrical generator 16. Water discharges from the turbine 14 through conduit 18 and the electrical leads 20 leading from the generator terminate at transformer 22, where the generator voltage of 13 KV is boosted to 125 KV or greater for use by the transmission network identified by arrow 24.

A major aspect of the present invention is the increase in the total power generation between 20 and 50% from that attainable by the existing hydro-electric power system constituting turbine generator unit or units 12 by the addition of a solar power station to the system. As identified schematically in FIG. 1, the solar power station 26 is illustrated as being at the same general location as the existing hydro-electric power system turbine generator 12. However, it may be physically positioned anywhere within the electrical transmission network, for instance, it may be in Southern California, and tied electrically to a hydro-electric power plant operating in the Spokane, Wash., area, where due to the lack of sufficient sunlight, its days of solar generation would be considerably less than the same installation in Southern California. In that respect, the tubular heat receiver 28 constituting a boiler-superheater is more clearly disclosed in co-pending application Ser. No. 399,670 filed on Sept. 21, 1973, and entitled "Peak Efficiency Solar Energy Powered Boiler and Superheater," and assigned to the common assignee and reference may be had thereto. It consists of suitable tubing defining at least a boiler section and a superheated steam section within the cavity and being connected for closed loop steam circulation with the turbine 30 of the turbine generator unit 20. A feed line 32 feeds steam from the heat receiver 28 to the steam turbine 30 and return conduit 36 leads from the steam turbine 30 back to the heat receiver. In the illustrated embodiment of FIG. 1, the heat receiver 28 (boiler-superheater) is physically supported (by means not shown) at some distance above the ground level G, with its axis horizontal and being given a north-south orientation. Preferably, the ground G slopes vertically upward at the north end of the heat receiver as at H or at least a first fan shaped concentrating heliostat array indicated generally at 38 includes a plurality of rows of concentrating spherical concave mirrors 40; individually numbered at 101 through 120, FIG. 2, with the rows being vertically raised or stepped progressively in a direction away from the heat receiver 28 to prevent shadowing and the number of spherical concave mirrors increasing in the rows proportionately in the direction away from the heat receiver such that the mirrors all reflect solar rays within a 45° approach angle to the aperture of the heat receiver. Planes P1 and P2 constitute the heat receiver apertures and the focal planes for the concentrated reflected thermal energy from each of the spherical concave mirrors 40 of both the inclined concentrating heliostat array 38 and the horizontal concentrating heliostat array 42. Array 42 lies south of heat receiver 28 and to the right in FIG. 1 of focal plane P2 of the dual ended heat receiver 28. Each mirror 40 has a radius of curvature corresponding to its distance from the aperture of the solar energy receiving cavity of receiver 28, such that reflected solar energy is focused at the aperture plane.

Figure 2:
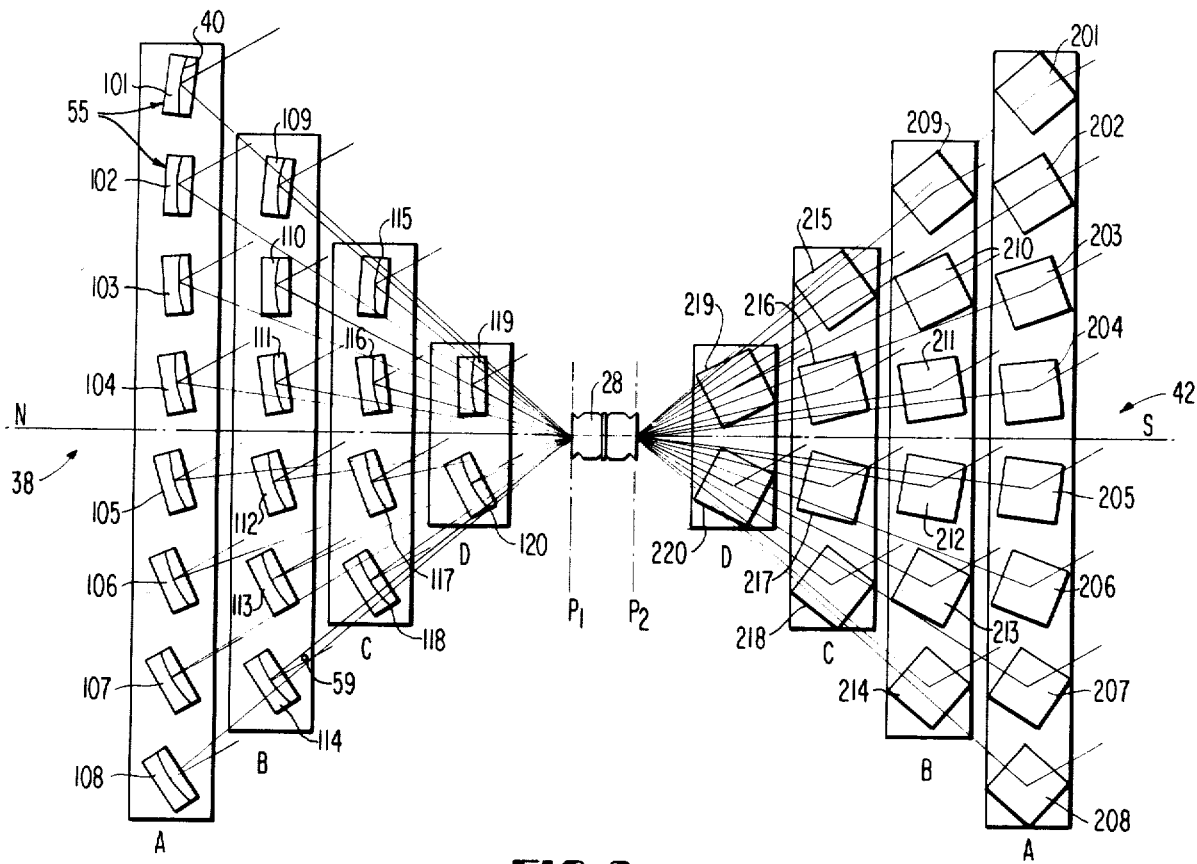
FIG. 2 is a plan view of the concentrating heliostat forming a part of the solar thermal power plant of FIG. 1.

Reference to FIG. 2, which constitutes a plane view of the double ended solar energy conversion system of the present invention, forming a part of the solar power plant 26, shows that each concentrating heliostat array 38 and 42 is formed of four rows of spherical concave reflecting mirrors, the rows being identified as A, B, C, and D, in the direction away from the heat receiver, starting from the row most removed from the heat receiver in each case. Row A for the concentrating heliostat array 38 is provided with eight spherical concave mirros, Row B with six such mirrors, Row C with four such mirrors, and Row D with two, the mirrors being numbered 101 through 120 respectively. In similar fashion for concentrating heliostat array 42, 20 such mirrors are provided at similar positions as identified at 201 to 220 respectively. As best seen schematically in FIGS. 1 and 2, each of the mirrors 40 for both heliostat arrays, in addition to constituting spherical concave reflective surfaces, are mounted for rotation about intersecting right angle or orthogonal axes at the center of the spherical reflecting surface. That is, on the hillside H, for each tracker 55, horizontal mount 48 comprises yoke means for pivoting mirror 40 about its center C both about the horizontal axis 49, as indicated by arrow 50, and further about a vertical axis 52 as indentified by arrow 54. At each tracker 55 location a fixed support 57 maintains optical sensor 59 at a fixed position in line with the center of its mirror 40 and the center of the receiver aperture and servo mechanism shown by box 61 connected electrically via line 63 to drive the mirror 40 about the center pivot axis to maintain alignment by a mechanical drive indicated schematically by dotted line 65 connected to the mirror center C. The servo mechanism is otherwise conventional.

Figure 4:
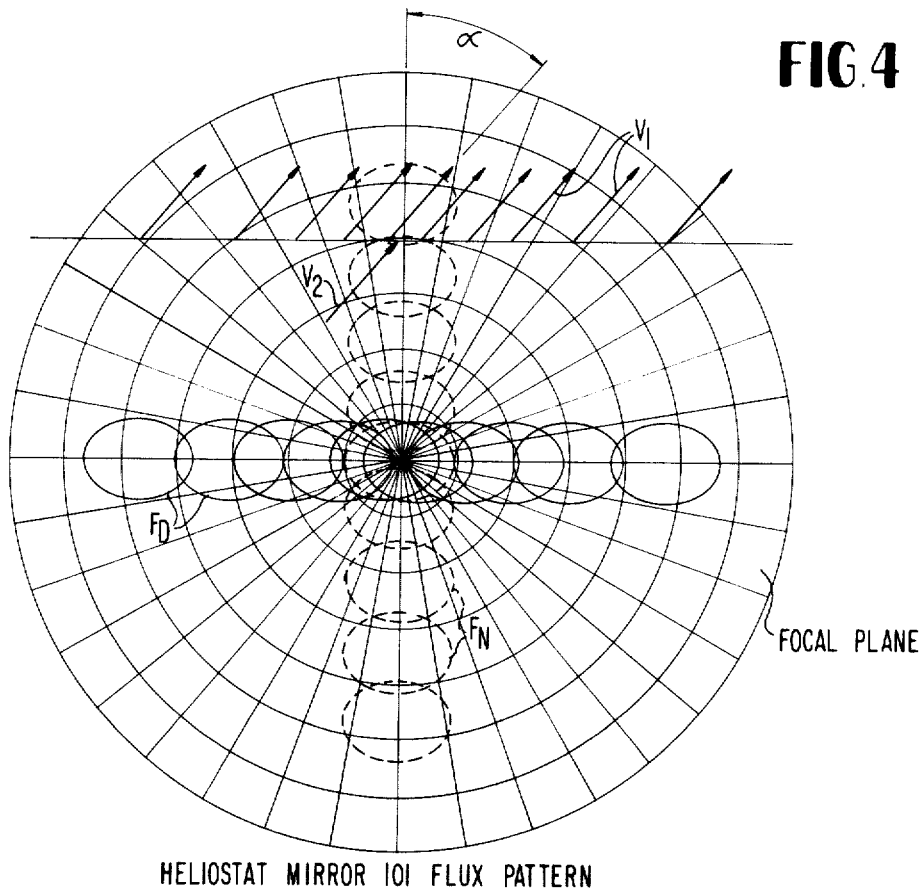
FIG. 4 is a flux pattern for a given concentrating heliostat mirror of the solar thermal power plant of FIG. 1.

Thus, the concentrating heliostat comprises the two functions of the classical heliostat, that is: (1) the reflecting into a stationary zone of a column of sunlight, and (2) the concentration of the columnized sunlight to high energy levels by the focusing effect due to the curvature of the reflecting surface of each of the spherical mirrors 40 to high energy levels required for efficient thermal conversion device into a single reflecting system. In this regard, the system is dynamic in nature, that is, the mirrors 40 of both heliostat arrays 38 and 42 are controlled by sensor-servo mechanism to track the bisector of the angle between the sun-mirror vector and the heat receiver-mirror vector. The sensor-servo mechanisms are conventional in nature and the mirror tracking of the bisector results in a reflected solar beam the size of the mirror projection perpendicular to the sun line being maintained around the mirror-heat receiver vector. It is the introduction of the unique spherical concave curvature into individual mirrors at each tracking station that permits the concentration of rays leaving each mirror into a generally linear pattern at the focal plane P1 or P2 (corresponding to the heat receiver aperture at each end of heat receiver 28), as best shown in FIG. 4. As further evidenced in FIG. 1, mirrors 108, 114, 118 and 120 have different orientation angles in elevation with mirror 104 reflecting solar energy most directly into the heat receiver aperture with minimum distortion. The effect of the concentration of one beam of the solar energy may be seen by comparison between the surface area of the spherical concave mirror 104 and the dimensions of the heat receiver as seen both in the elevational view of FIG. 1 and the plan view of FIG. 2, keeping in mind that the aperture itself is smaller in diameter than the tubular (cylindrical) heat receiver. With the mirrors being spherical in curvature, the concentration of the rays leaving the mirror, at each mirror station causes the rays leaving the mirror to take the form of a linear pattern at the focal plane as shown in FIG. 4, with the linear pattern rotating with the time of day as the tip positions of the mirror vary in equivalent optical error caused by their specific azimuth and elevation location. Dawn paraxial vectors are shown at $V_1$ and Noon paraxial vectors are shown at $V_2$. The horizontal "dawn linear position" $F_D$ results from maximum aximuth/minimum elevation error combinations and the vertical "noon linear position" $F_N$ results from maximum elevation with minimum aximuth error combination. For mirror 101, the ray approach angle $\alpha$ is 41.19°. While there is some compromise therefore in terms of the spherical nature of the surface of the mirror 104 as contrasted to the more perfect reflecting surface of a typical paraboloid, the resulting energy flux patterns within the heat receiver constitutes spots about which the linear concentrated energy patterns rotate. As the spots do not move, the energy packets from each mirror in the collection field as ascertained by the apertures at each end of the heat receiver for respective heliostat arrays 48 and 40 maintain their dispersion within the heat receiver (preferably a boiler-superheater) enabling a straight forward thermal analysis to control the design of the conversion heat transfer equipment.

As seen from FIGS. 1 and 2, the basic design for either a single ended or double ended solar energy conversion system forming a portion of the present invention, constitutes a set of trackers 55 and a fan shaped layout on a sloping hillside or formed structure with the axis of the fan on a north-south line and coaxial in alignment with the axis of the heat receiver. The trackers may be either north or south of the heat receiver or combined as illustrated in the drawings to deliver energy on both the north and south sides of the heat receiver. Each of the mirrors 40 in addition to being spherical and concave in configuration, constitutes preferably a surface vapor deposited aluminum or other suitable metal coating deposited on a suitable substrate which may be glass, polished metal or a glossy finish plastic. Curvature is obtained by controlling distortion of plane mirrors by adjustable mounting points in the backing structure, if desired. Because of the large radius of curvature, the mirrors 40 are squared at the periphery. Curvature is unique for each mirror position, and is based on a theoretical circular concentration for a single point in time in the travel, such as the aximuth-elevation constellation for the equinoxial date at 10:00 A.M. The errors from circular concentration at all other times are similar to those from physical imperfections in ordinary parabolic mirror.

With respect to the concentrating heliostat, more particularly shown in FIG. 2, it provides the means to most efficiently collect solar energy from large reflecting mirror fields at sufficiently high intensity levels required to operate thermal energy conversion devices, requiring temperatures on the order of 1000° F. plus. The concentrating heliostat combines the practical features of the classical heliostat-paraboloid mirror system used in solar furnaces for high temperature research into a single reflection system, thereby reducing the reflective energy losses by one-half and maintaining concentration performance approaching single piece paraboloids. As mentioned previously, the concentrating heliostat forming an important feature of the present invention eliminates the most costly elements of the classical heliostat, that is, the large area paraboloidal mirror which concentrates the reflected solar rays from the planar mirror at a desired focal point; while this occurs with a compromise in the optical pattern, the concentration is sufficient in terms of the size of the aperture of the heat receiver or apertures of the heat receiver for dual mirror arrays, to permit the concentrated thermal energy to create superheated steam for the steam turbine generator. Further, in contrast to the semi-heliostat employing dynamic mirrors tracking to a common focus, the present invention permits reduction in size of the heat receiver aperture below that of the individual mirror size to greatly improve the thermal energy retention. The use of spherical concave mirrors instead of paraboloidal mirrors in a tracking mirror thermal energy collector is vastly cheaper than the manufacture of precision parabolodial mirrors, and permits concentration of the solar energy to effect temperature levels above 1000° F., in contrast to a maximum realizable temperature of 500° F. for parabolic cylinder collection systems.

By use of the single or double ended solar energy conversion system of FIG. 2, in terms of the concentrating heliostat, may be most effectively employed in conjunction with existing hydro-electric power generation, as further evidenced in FIG. 1.

Figure 3:
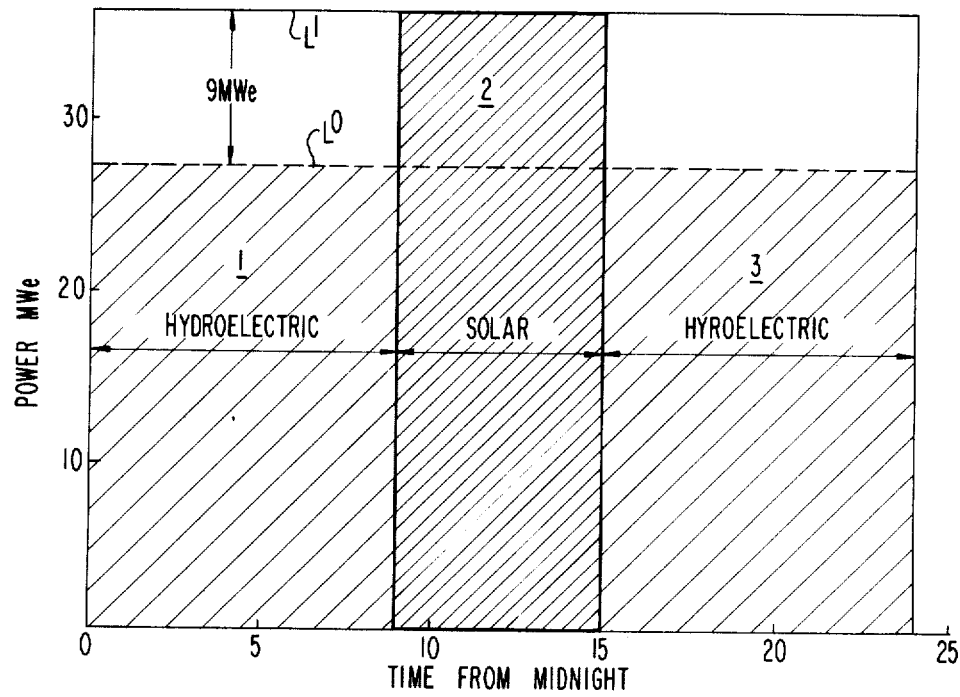
FIG. 3 is a capacity characteristic chart for the solar hydro-electric power system of FIG. 1.

Reference to FIG. 3 shows the manner in which at least a 25% increase in overall power generation is attainable from the existing hydroelectric power system 12 of FIG. 1 by the addition of the solar power generator station 26 to the system. Solar power supplies the full line capacity during sunlight and immediate post-sunlight period. As shown in the example of FIG. 3, based on the Salt River Project, horizontal line L represents the maximum average generation level with the existing installation which is approximately 28 MW (megawatts, electrical), while the horizontal line L' represents the increase in power generation of about 25% or 9 MWe(megawatts) as a result of employing the shaded bar 2, that is, solar power generation whose width dimensions illustrates the equivalent power saved in form of above-the-dam water which is stored for use during that period of time defined by bars 1 and 3 which represent in rectangular form, the portion of time at which hydro-generation occurs. For bars 1 and 3, the difference between lines L and L' identify the increase in hydro-power from the water saved during the solar operation, although over a 24 hour period (where sunlight is available between a time period extending from 9:00 A.M. to 3:00 P.M.) the same amount of water is employed but with maximum efficiency (no additional energy requirements other than solar power) and while employing maximum power generation capacity of the hydro-electric generators. During the period of solar operation, the water required for the base load is saved above the dam, and during hydro-generation the rate is increased to match the solar peak without increasing the total water flow over the full period of operation.

In addition to the improvement as evidenced in FIG. 3 for a solar augmented hydro-electric power system, an even greater improvement may occur where the existing power station of FIG. 1 employs an auxiliary hydro-electric power generator indicated generally at 60, consisting of a pump back turbine generator including turbine section 62 and generator 64. In this case, water is supplied from the upstream dam or reservoir 11 through conduit 66 and discharged from turbine 62 through conduit 68 which leads to a dam or reservoir 69 immediately downstream of generator unit 60, where the water is stored, perhaps in conjunction with water discharged from hydro-electric generator unit 12 through discharge conduit 18, the water being metered from a downstream dam 69 to the water users downstream while some of the water is stored for pump back operation. In this case, either at the time that the load on the hydro-electric generator system is below generating capacity, or preferably at the time that the solar power plant 26 is operating to maintain system load through transformer 22, electrical energy may be taken from the system load as evidenced by arrow 66 and the turbine generator unit 60 is transformed to a motor driven pump permitting unit 60 to pump back the water not necessary to the downstream water users' demand to the upper dam 11. However, as mentioned previously, the energy cost for the pump back operation is 3/2 X fuel cost for the base load kilowatt from the steam plant necessary to provide such power. The solar augmentation of the system of FIG. 1, however, is further advantageous in that electrical power may be made readily available from the solar power plant 26 for pump back operation, particularly where the capacity of the solar power plant is in excess of the electrical load on the system in which case the difference of available electrical energy from the solar power plant 26 and the electrical load on the system permits that differential to be employed in driving generator 64 as a motor and employing turbine 62 as a hydraulic pump to pump back the water from the lower dam 69 to the upper dam 11. Most importantly, solar augmentation as evidenced from FIG. 3 provides an overall system performance improvement rather than just a peak period performance gain as would be achieved by the use of the supplemental or auxiliary hydro-electric generator 60 operating in conjunction with the main hydro-electric power plant 26 for peak operation, and wherein during off-peak hours is driven as a motor pump unit to pump back accumulated water from the lower dam to the upper dam.

To summarize, the system of the present invention achieves operation of improvements equivalent to pump storage hydro-electric systems with only one reservoir, that is, the upstream dam. It can increase the output of an isolated hydro-electric installation as opposed to pump storage systems requiring both high and low elevation reservoirs. The system of the present invention supplies total output of both solar and hydro-electric power generation to the electrical power distribution system, while pump storage has inherent energy losses in the pumping cycle. When employing both the solar and the hydro-electric power generation, particularly where downstream water use requirements are low, extremely high, load conditions may be advantageously met under emergy conditions. The system of the present invention uses solar energy at substantially higher efficiency, particularly due to the employment of the concentrating heliostat by generating steam at high pressure and high temperatures, particularly suitable to a steam turbine generator conversion unit. Most importantly, the system of the present invention permits the increase in the output of an existing hydro-electric system which is normally limited by natural water supply, without changing the overall usage of water of that supply.

While the invention has been particularly shown and described with reference to preferred embodiments thereof, it will be understood by those skilled in the art that various changes in form and details may be made therein without departing from the spirit and scope of the invention.

What is claimed is:

1. In an existing hydro-electric power plant including a hydro-electric generator means of given capacity powered by water stored in a reservoir upstream of said hydro-electric generator means, an electrical transmission network connecting said hydro-electric generator means to an electrical load, the improvement comprising:
   a solar power generator means having a capacity matching that of said hydro-electric generator means, and said transmission network including means for selectively connecting either or both of said generator means to said electrical load,
   whereby, integrating the solar and existing hydro-electric power plant permits the output of the power installation to be increased without an overall increase in the use of water stored by said reservoir.

2. The hydro-electric power plant as claimed in claim 1, wherein said solar power generator means is remote from said hydro-electric generator means.

3. In an existing hydro-electric power plant including a hydro-electric generator means of given capacity powered by water stored in a reservoir upstream of said hydro-electric generator means, an electrical transmission network connecting said hydro-electric generator means to an electrical load, the improvement comprising:
   a solar power generator means having a capacity matching that of said hydro-electric generator means, and said transmission network including means for selectively connecting either or both of said generator means to said electrical load,
   whereby, integrating the solar and existing hydro-electric power plant permits the output of the power installation to be increased without an overall increase in the use of water stored by said reservoir,
   Further comprising an auxiliary hydro-electric generator means powered by water from said upstream reservoir, a second reservoir downstream of said auxiliary hydro-electric generator means fluid coupled thereto for storing at least that volume of water passing through said auxiliary hydro-electric generator means from said upstream reservoir, means for terminating operation of said auxiliary hydro-electric generator means during operation of said solar powered generator means, and means for supplying excess electrical power from said solar powered generator means to said auxiliary hydro-electric generator for driving the generator thereof as a motor and operating said turbine as a pump, while said auxiliary hydro-electric generator means is fluid coupled between said reservoirs for pumping back at least the volume of water passing from said upstream reservoir to said downstream reservoir therethrough to further increase the total power generation of said power plant, without the necessity of an increased use of the available water supply.

4. In a thermal energy conversion system including a heat receiver defining a planar solar ray receiving aperture at right angles to a north-south axis passing through said plane, the improvement comprising:
   a concentrating heliostat positioned on said axis at some distance from said aperture plane, said heliostat comprising:
   at least one array of spherical, concave mirrors,
   means for mounting each of said mirrors for orthogonal pivoting about a point passing through the center of said mirror, each of said means having a radius of curvature unique to its position with respect to said aperture to provide focusing about the center of said aperture,
   sensor/servo mechanisms for pivoting said mirrors independently orthogonally about said center pivot point to track the bisector of the angle between the sun-mirror vector and the heat receiver-mirror vector to effect concentrated solar energy focusing at said solar ray receiving aperture of said receiver over a significantly smaller surface area than the surface area of each mirror,
   whereby, said heat receiver is subjected to highly concentrated surface solar radiant energy, and wherein the concentration of the rays leaving each mirror takes the form of a linear pattern at a focal plane corresponding to the solar ray receiving aperture and said linear pattern of each mirror rotates balancing the concentrated energy at the focal plane.

5. The thermal energy conversion system as claimed in claim 4, wherein said plurality of spherical, concave mirrors comprise a fan shaped array diverging in the direction away from the solar ray receiving aperture of the heat receiver, said fan shaped array being aligned with the north-south axis of the heat receiver and with said mirrors being inside a conical approach angle which is not greater than 45° relative to said north-south axis of the heat receiver.

6. The thermal energy conversion system as claimed in claim 4, wherein said fan shaped array of spherical, concave mirrors rise in elevation progressively from said heat receiver such that the mirrors closest to the heat receiver do not block the reflected rays from the mirrors more remote from the heat receiver.

7. The thermal energy conversion system as claimed in claim 4, wherein said heat receiver is tubular in form and is double ended to define two verticl solar ray receiving apertures at corresponding focal planes, and said fan shaped array of mirrors comprise two in number, one being positioned to the south of the heat receiver and facing north and the other being positioned north of the heat receiver and facing south and wherein one of said fan shaped arrays has its mirrors mounted on the same horizontal plane while said other array has its mirrors at progressively vertically raised positions in a direction away from said heat receiver.

8. The thermal energy conversion system as claimed in claim 4, wherein the surface area of said solar ray receiving aperture is approximately one twenty-fifth the surface area of each spherical, concave mirror of the concentration heliostat.

9. The thermal energy conversion system as claimed in claim 5, wherein the surface area of said solar ray receiving aperture is approximately one twenty-fifth the surface area of each spherical, concave mirror of the concentration heliostat.

10. The thermal energy conversion system as claimed in claim 6, wherein the surface area of said solar ray receiving aperture is approximately one twenty-fifth the surface area of each spherical, concave mirror of the concentration heliostat.

11. The thermal energy conversion system as claimed in claim 7, wherein the surface area of said solar ray receiving aperture is approximately one twenty-fifth the surface area of each spherical, concave mirror of the concentration heliostat.

* * * * *